United States Patent [19]

Smith

[11] Patent Number: 5,659,243
[45] Date of Patent: Aug. 19, 1997

[54] HIGH ISOLATION, POWER-ON CONTROL CIRCUIT FOR AIRCRAFT EXTERNAL POWER CONNECTION

[75] Inventor: Gerald L. Smith, Torrance, Calif.

[73] Assignee: MAGL Power Inc., Torrance, Calif.

[21] Appl. No.: 551,200

[22] Filed: Oct. 31, 1995

Related U.S. Application Data

[63] Continuation-in-part of Ser. No. 333,779, Nov. 3, 1994, abandoned.

[51] Int. Cl.$^6$ .................................................. G01R 19/22
[52] U.S. Cl. ........................... 324/119; 340/945; 340/532; 324/158.1
[58] Field of Search ............................ 324/158.1, 73.1, 324/119, 110, 522, 555, 512; 340/531, 532, 514, 508, 945, 660, 661, 662; 244/1 R

[56] References Cited

U.S. PATENT DOCUMENTS 3,840,782 10/1974 Monaghan ............................ 361/58
5,499,187 3/1996 Smith ................................... 363/142

*Primary Examiner*—Ernest F. Karlsen
*Assistant Examiner*—Russell M. Kobert
*Attorney, Agent, or Firm*—Monty Koslover Assoc.

[57] ABSTRACT

A power-on control circuit which functions to inhibit and prevent turn-on of an external power supply to an aircraft, unless a continuity signal is received from the aircraft indicating proper mating of the external power plug in the aircraft socket, thus preventing the hazards of an improper connection. The invention power-on control circuit incorporates a subcircuit for generating an acquisition signal to confirm continuity of connection, and a sensing and detector sub-circuit to enable turn-on of an external power source supplying power to an aircraft. The control circuit contains high ohmic isolation between logic elements and the aircraft, and is not sensitive to coupling with extraneous signals.

3 Claims, 3 Drawing Sheets ated to a portion of an aircraft electrical power system; FIG. 2 is a simplified schematic diagram of an improved power-on circuit according to the present invention, and an external power source shown connected to a portion of an aircraft electrical power system; and FIG. 3 is a simplified schematic diagram of the detector circuit portion of the invention power-on circuit, and useful in illustrating the detector circuit relationship with the current sense and start/stop switch portions of the device.

HIGH ISOLATION, POWER-ON CONTROL CIRCUIT FOR AIRCRAFT EXTERNAL POWER CONNECTION

This application is a continuation-in-part of application Ser. No. 08/333,779 filed Nov. 3, 1994 and now abandoned.

BACKGROUND OF THE INVENTION

This invention relates to systems and devices for connecting external auxiliary electrical power to an internal aircraft power system, and particularly to the electrical power-on control circuits used to start power flowing to an aircraft.

Commercial aircraft need to be supplied with electrical power while parked at an airport gate, prior to departure.

This electrical power is supplied either by a mobile power unit or by an equipment electrical power installation at the airport, providing auxiliary power. In either case, the power, which is usually 3-phase 400 Hz ac, is supplied through a cable having a large male connector plug. The installation or mobile power connector plug is first pushed in until it is properly mated with the aircraft power connector socket. The external power source is then manually switched on and power flows through the power connector into the aircraft.

A power-on control circuit, which may be located anywhere convenient, is used to start a mobile or installation power source, or simply to close contactors connecting power from an operating source. This power-on control circuit is connected to terminal pins in the external power connector plug used to make connection with an aircraft power system.

When the external power connector plug is plugged in the aircraft socket, the power-on control circuit senses whether a dc signal from the aircraft is present. If it is not present after a fixed time period, the external power source is automatically shut down. This action is taken to avoid continuing to supply power to an aircraft if a power connection is not properly made. A service technician can then go and correct the power connector condition.

In the presently available power-on control circuits employed in aircraft external power source connectors, an external power source is immediately activated by a pushbutton or switch and remains activated for at least four seconds. During this four second period, the connector plug is live with high power whether or not it is connected to the aircraft. This can be a cause of damage to the aircraft internal power supply if any connection pin is open, particularly if the connector neutral is open. On some occasions, it has been reported that an external power connector plug either fell out of the aircraft socket on to the ground or was not put in place at all. If the connector plug should land in a puddle of fluid, an external source start-up could be hazardous indeed.

While the presently employed external power control circuits for the most part operate satisfactorily, occasionally there are circuit failures caused by received power spikes or coupled signal pickup. Thus an isolation of power-on control circuit switching elements is highly desirable.

It is primarily to avoid the potential damage and hazards inherent in the use of available power-on control circuits which connect external power to aircraft, that the present invention power-on control circuit is offered. A secondary objective is a reduction in power-on control circuit failures.

SUMMARY OF THE INVENTION

The invention power-on control circuit functions to inhibit and prevent turn-on of an external power supply to an aircraft, unless a continuity signal is received from the aircraft indicating proper mating of the external power plug in the aircraft socket. The control circuit contains a subcircuit for generating an acquisition signal to confirm continuity of connection, and a sensing and detector subcircuit to enable turn-on of the external power source and supplying power to an aircraft. The control circuit contains high ohmic isolation between the circuit logic elements and the aircraft, and is not sensitive to long cable runs or to coupling with extraneous signals.

Accordingly, it is a principal object of this invention to provide a power-on control circuit that inhibits the application of external power through a power connector to an aircraft, unless a power connection is properly made with the aircraft, preventing possible hazards to the operators and damage to the aircraft.

Another object is to provide a power-on control circuit which is immune to extraneous signal coupling and insensitive to long cable runs.

An advantage of the invention power-on control circuit is its demonstrated high reliability.

Further objects and advantages of the invention will be apparent from studying the following portion of the specification, the claims and the attached drawings.

DESCRIPTION OF THE PREFERRED EMBODIMENT

Figure 1:
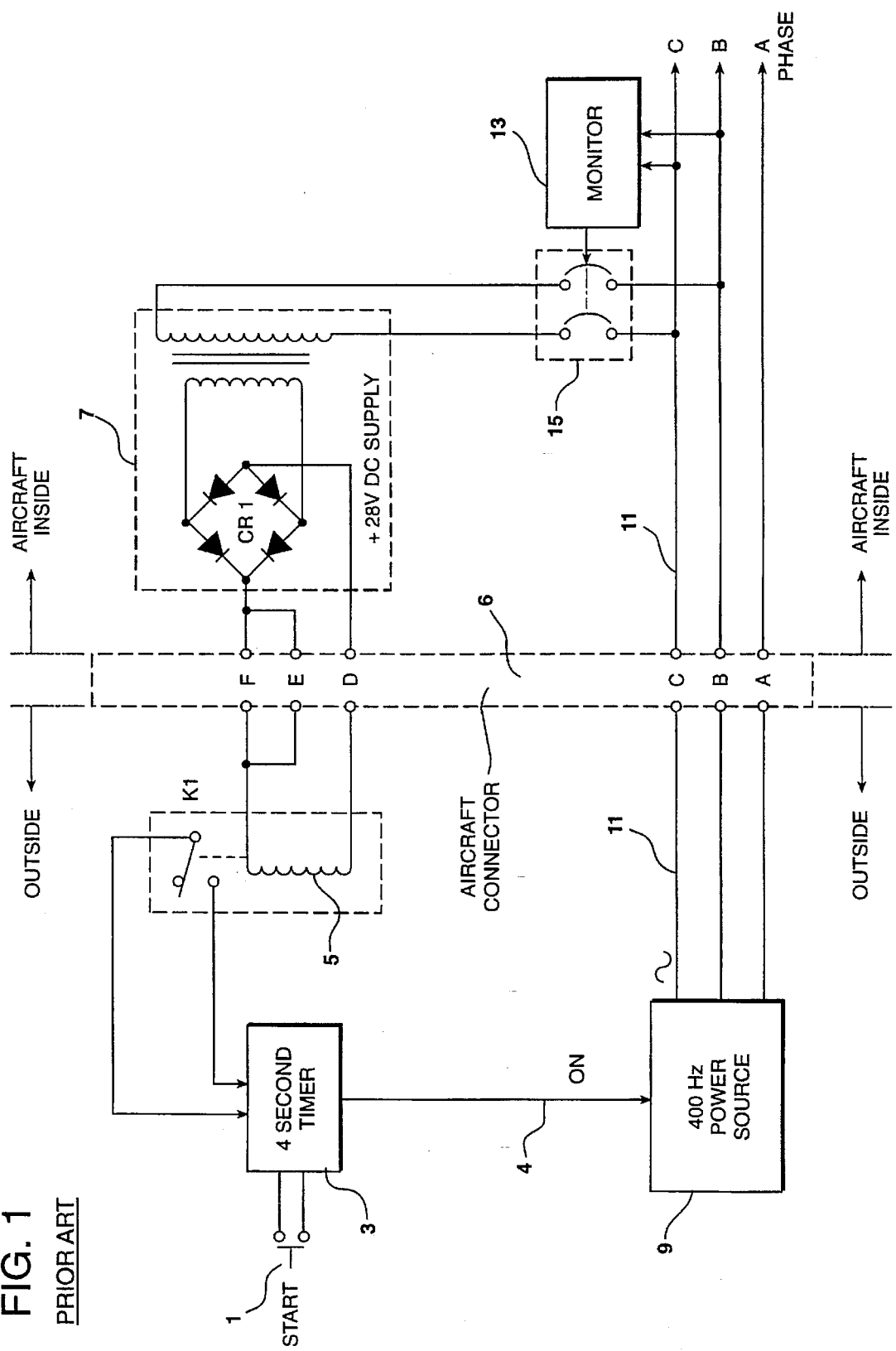
FIG. 1 is a simplified schematic diagram of a prior art power-on circuit, and an external power source shown connected to a portion of an aircraft electrical power system.

Referring to the drawings, there is shown in FIG. 1 on the left side of the drawing, a simplified schematic diagram of a prior art power-on control circuit and a 400 Hz Power source 9. The power-on control circuit comprises a start-up switch 1, a timer circuit 3 to which the start-up switch 1 is connected and a relay (K1).

The relay (K1) coil 5 input lines are connected to pins E, F and D of an aircraft power connector 6, while the relay switch contacts are connected input to the timer circuit 3. The timer circuit 3 produces an "ON" signal which is connected 4 to the start-up control of the 400 Hz power source 9. This "ON" signal is produced immediately upon manual closure of the start-up switch 1 and activates the 400 Hz power source for a fixed time period, typically four seconds.

Part of an aircraft electric power system is shown on the right hand side of FIG. 1. The power-on control circuit and the 400 Hz power source are connected to the aircraft electric power system through connector 6 terminal pins A, B, C, D, E and F. Pin D serves as the neutral for both power and signal flow.

Operation of the power-on control circuit is as follows: The start-up push-button switch 1 is pushed and the timer circuit 3 responds by transmitting an "ON" signal 4 to a 400 Hz power source 9, holding the "ON" signal for at least 4 seconds. The power source 9 activates immediately on receipt of the "ON" signal and connects 400 Hz power through the power cable lines 11 to the aircraft internal power lines. In the aircraft, a monitor 13 detects the presence of the input 400 Hz power and closes contactors 15 which are connected across at least two phases of the incoming power lines. Closing the contactors 15 supplies power to the aircraft +28 vdc power supply 7, which is now energized and produces +28 vdc at the output of its rectifier bridge CR1. This +28 vdc output is conducted through connector pins E, F and D to the power-on circuit and energizes the coil 5 of relay K1, closing the relay contacts. Closure of the relay contacts supplies a "closure" signal input to the timer circuit 3 which latches its output 4 "ON" signal on, continuing to transmit an "ON" signal 4 to the 400 Hz power source 9. The relay K1 must energize during the initial 4 second activation, else the "ON" signal output 4 of the timer to the 400 Hz power source will stop, and power will stop flowing to the aircraft.

In some modern versions of the power-on control circuit shown in FIG. 1, solid-state switches substitute for the relay K1. However, their function and connection are the same as the relay. A circuit producing an illuminated indication of the presence of a +28 vdc signal may also be included.

In considering the above prior art power-on control circuit, it is clear that an initial 4 seconds of live 400 Hz power can be applied to the cable power connector plug whether the connector plug is mated with the aircraft connector receptacle or not. This can be hazardous if the connector plug is not mated, depending on where the connector plug is located at the time. There is also no prohibition on the operator repeating the 4 second power surge a number of times, a situation which is not uncommon.

Trouble-shooting practice has found that in a large number of cases, the cause of an apparent open circuit in the auxiliary power connector to aircraft connection was a bent or broken neutral pin in the center of the connector plug, or a broken neutral line in the power cable itself. Rough handling is generally the culprit for this.

Should, the neutral be open, a starting 3-phase 400 Hz power surge in the aircraft system will be unregulated and probably unbalanced, leading to possible damage to parts of the aircraft power system.

In view of the foregoing possible hazards and damage associated with use of the currently available power-on control circuits, an improved power-on control circuit device is offered by the present invention.

This improved power-on control circuit would inhibit the connection of 400 Hz power to an aircraft unless a confirmation of continuity in the cable plug to aircraft socket connection is received by the control circuit.

Figure 2:
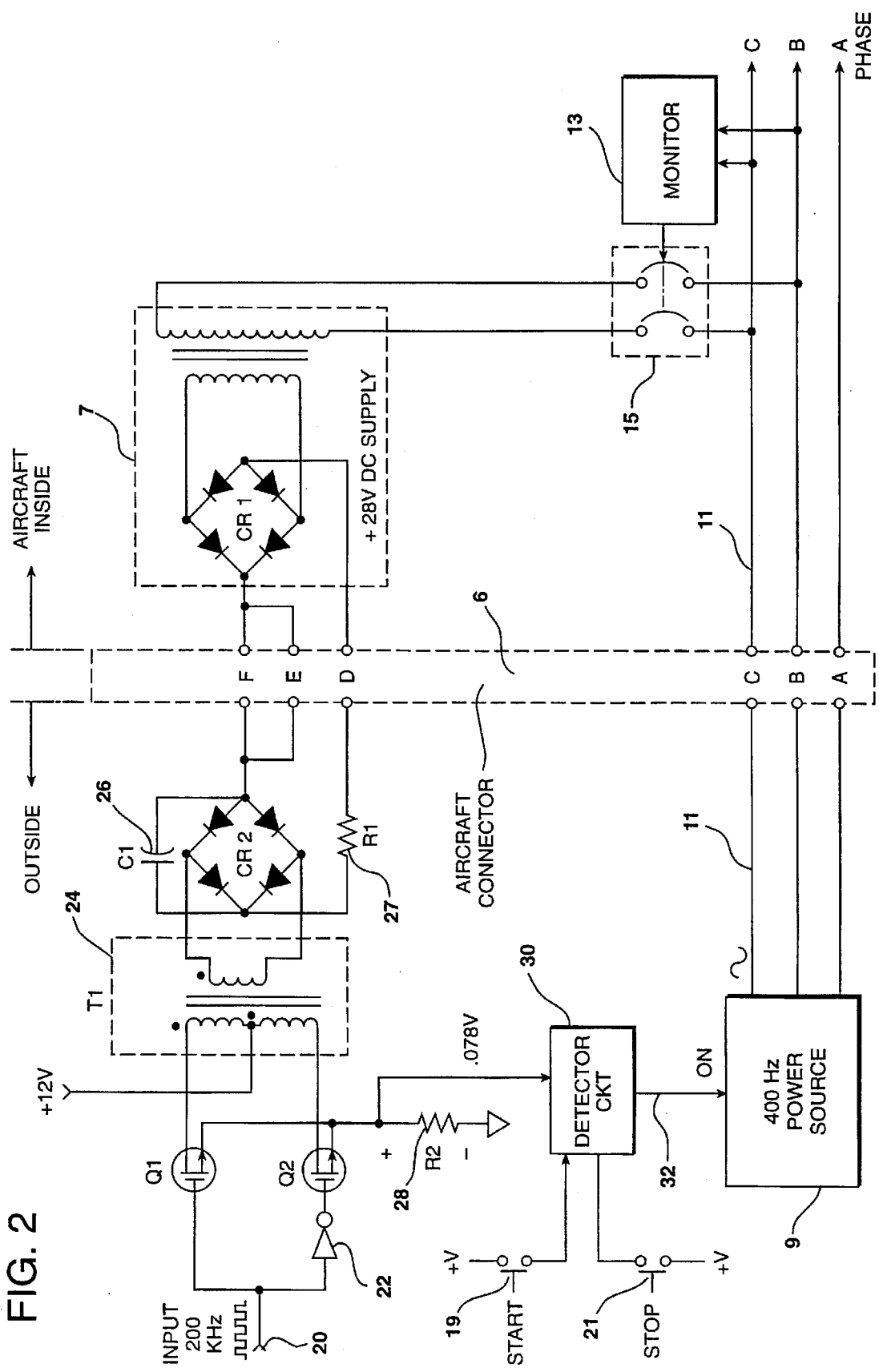
FIG. 2 is a simplified schematic diagram of an improved power-on circuit according to the present invention, and an external power source shown connected to a portion of an aircraft electrical power system.

The proposed power-on control circuit of the present invention is described as follows:

Refer now to FIG. 2. FIG. 2, on the left side of the drawing, shows a simplified schematic of the invention power-on circuit having an output connected to a 400 Hz power source 9. Both the power-on circuit and the 400 Hz power source 9 three-phase output 11 are shown connected through a power connector 6 to a portion of an aircraft electrical power system. This is a typical connection required to supply external electrical power to an aircraft.

The power-on circuit comprises a means for applying a generated signal to the aircraft D, E, F terminals and processing a return signal, a current sense, start and stop switch means, and a detector circuit that permits power from an external power source to flow through aircraft power connector 6 terminals A, B, C.

Assuming the external power connector is connected with an aircraft, before an operator manually pushes the START button 19, the power-on circuit generates and applies a low voltage dc signal to aircraft connector 6 terminals D, E, F. Note that terminals E and F are tied together.

If terminals D, E and F are properly connected, the low voltage dc signal will be directly connected to a rectifier bridge CR1 in the aircraft +28 vdc power supply 7. At this time, the aircraft +28 vdc power supply 7 is not energized. Current will flow through part of the aircraft power supply bridge CR1 and back to the power-on circuit, which processes the returned signal and connects it to a current sense, providing a low voltage output signal of about 0.078 vdc representing the current in the circuit. This 0.078 vdc signal is connected input to a detector circuit 30.

Now, when an operator pushes the START pushbutton 19, the detector circuit 30 will compare the current sense 0.078 vdc signal to a reference and output a high ON signal 32 which is connected to a 400 Hz power source 9. 400 Hz 3-phase power 11 then flows through aircraft power connector 6 terminals A, B, C into the aircraft, and will continue flowing until it is switched off by pushing the STOP pushbutton switch 21. If the current sense signal into the detector circuit had been too low or non-existent, as would be the case for an open connector, the detector circuit would not have output a high ON signal, and the 400 Hz power would remain off or unconnected.

When the 400 Hz power does flow into the aircraft through the connector 6, the power voltage presence is sensed by a monitor 13 in the aircraft. The monitor 13 closes contactors 15 which supply ac power to a +28 vdc power supply 7, energizing the dc power supply. As a result, the power supply rectifier bridge CR1 outputs a +28 vdc signal through terminals F, E, D to the external power-on circuit. This signal is fed back through rectifier bridge CR2 to transformer T1 24, to FET drivers Q1 and Q2 and thence to the current sense 28, where the current sense output voltage signal would be increased.

The increased voltage signal into the detector circuit 30 will not disturb the detector circuit operation and can be used, if needed, to indicate the presence of a +28 vdc output of the aircraft dc power supply, confirming aircraft power system energization.

Referring again to FIG. 2, the power-on circuit means for generating and applying a low voltage to an aircraft dc power system is as follows: A voltage oscillator connected to the circuit input terminal 20 provides approx. 200 Khz pulse signals. These pulse signals are connected in parallel to the gate of a first FET Q1 and to an inverter 22. The inverter 22 output signal of 200 Khz pulses, which is now negative going, is connected to the gate of a second FET Q2.

Both FETS are connected to the primary of isolation transformer T1 24, which has an approx. +12 volt input to the center tap.

The FETS act as a high frequency driver, producing a high frequency ac in the T1 transformer primary which couples the signal to its secondary. The secondary output terminals are connected to a full wave rectifier bridge CR2 which produces a dc output. A capacitor C1, 26 connected across the bridge output serves to decouple and smooth high frequency signals.

The CR2 bridge dc output voltage signal is connected to aircraft connector pins F, E, and through a current limiting resistor R1, 27 to connector pin D.

When the external power connector is properly mated with an aircraft power connector socket, a completed circuit is formed by the CR2 bridge, first resistor R1, 27 and the CR1 bridge in the aircraft. The voltage applied across the bridges is low and the current flow is low and is limited by first resistor R1, 27. No damage to the connected equipment is likely, whether the aircraft power supply becomes energized or remains dead.

The Q1 FET and Q2 FET source terminals are tied together and connected to a second resistor R2 which is connected to logic ground and serves as a current sense 28. The current sense 28 output voltage is connected input to a detector circuit 30.

Figure 3:
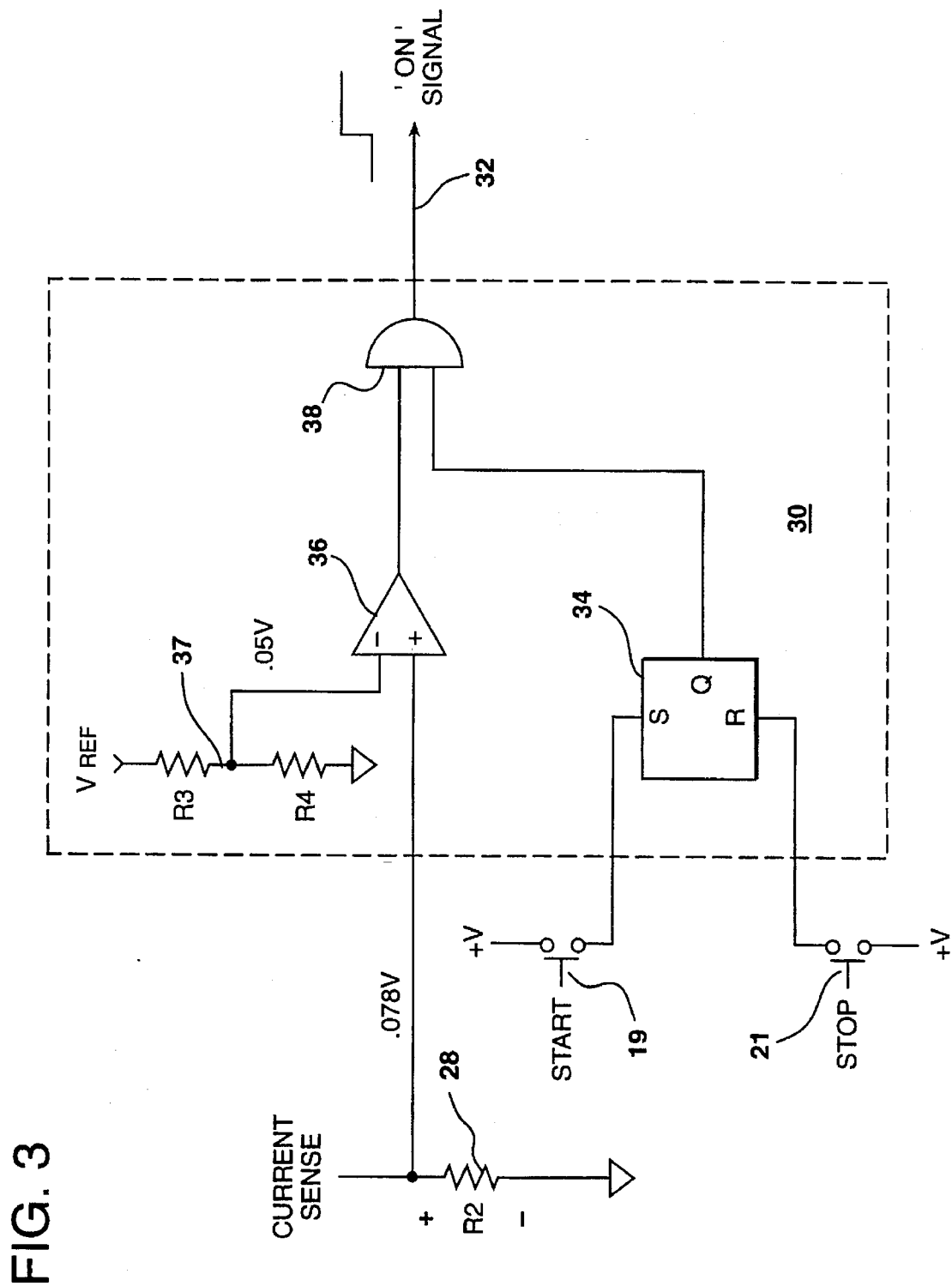
FIG. 3 is a simplified schematic diagram of the detector circuit portion of the invention power-on circuit, and useful in illustrating the detector circuit relationship with the current sense and start/stop switch portions of the device.

Refer now to FIG. 3 which is a simplified schematic of the detector circuit 30 and includes the current sense 28 and START and STOP switches 19, 21 to show their relationship with the detector circuit 30. The detector circuit comprises a flip-flop 34 which receives output signals from the START and STOP switches 19, 21, a voltage divider 37 which comprises two resistors R3, R4 supplied by a reference voltage source V ref, a comparator 38 which receives output signals from the voltage divider 37 and the current sense 28, and an AND gate 38 which receives output signals from the flip-flop 34 and the comparator 36.

In operation, when the external power connector is properly mated with an aircraft power connector socket, a voltage signal of about 0.078 v will be output by the current sense 28 and connected to a positive input terminal of the comparator 38. At the same time, the comparator 36 will have connected to its negative input terminal, a voltage signal of about 0.05 v from the voltage divider 37. As a result, the comparator will output a high signal which is connected to an input terminal of the AND gate 38.

When the START pushbutton switch 19 is depressed momentarily, a voltage signal is transmitted from the switch 19 to the S terminal of a flip-flop 34 causing its Q terminal to output a high signal. This output high signal is connected to the second input terminal of the AND gate 38. If both gate input signals are high, the AND gate 38 will output 32 a high signal which acts as an ON command connected to the 400 Hz power source 9.

When the STOP pushbutton switch 21 is depressed momentarily, a voltage signal is transmitted from the switch 21 to the R terminal of the flip-flop 34. This causes the flip-flop 34 to change its Q terminal output signal from high to low and disables the AND gate 38 which now drops its ON signal output, causing the 400 Hz power source supply to switch off.

All the components of the power-on circuit are small in size and the operating currents and voltage are very low. This makes for a small compact package which is convenient for inclusion at or near the end of a power cable connector which is supplying power from an airport installation or a mobile unit. In particular, the transformer T1 is very small, being a small toroid of magnetic material having less than eight turns per winding. The small number of turns provides an additional benefit of having a high common mode rejection as well as high isolation (>4,000 volts).

To sum up the advantages of the invention aircraft power-on control circuit as compared with the present state of the art aircraft power-on control circuits, the following applies. The invention power-on control circuit:

1. Inhibits the application of external power to an aircraft unless the power connection is properly made, preventing possible hazard to personnel or damage to the aircraft.
2. Provides ohmic isolation between the E, F, D connector terminals and control (>4000 volts isolation) and insulation from external power surges.
3. Incorporates high common mode rejection, resulting in less signal interference;
4. Incorporates an ability to sense a dead aircraft power system;
5. Is Insensitive to pick-up from power wiring (dc coupling only); and
8. Is small in size, compact and highly reliable.

These characteristics and advantages make the invention aircraft power-on circuit a significant improvement on the state of the art power-on control circuits.

From the above description, it is clear that the preferred embodiment achieves the objects of the present invention. Alternative embodiments and various modifications may be apparent to those skilled in the art. These alternatives and modifications are considered to be within the spirit and scope of the present invention.

Having described the invention, what is claimed is:

1. An electric power-on control circuit, for use in connecting externally supplied electric power at a power cable connector to an aircraft which is standing at an airport, the power-on control circuit comprising:

(a) a signal generator and processing circuit comprising:
an input terminal having an approximate 200 Khz pulse signal connected to said input terminal;
a signal inverter connected to said input terminal;
a high frequency driver pair comprising a first transistor and a second transistor, said input terminal being connected to the gate of said first transistor, the output of said signal inverter being connected to the gate of said second transistor;
an isolation transformer, said transformer having its primary winding connected at one end to an output of said first transistor and at its other end to an output of said second transistor, said primary winding having an approximate +12 v input signal connected to a center tap, said isolation transformer having a high frequency ac signal generated across said primary winding, and coupling said high frequency ac signal to its secondary winding;
a full wave rectifier bridge having its input connected across said secondary winding of said transformer, and serving to rectify said high frequency ac signal;
a first capacitor connected across the output of said rectifier bridge, and acting to decouple the ac input signal and smooth it; and
a first resistor connected to an output terminal of said rectifier bridge and acting to limit current flow;
said rectifier bridge having an output terminal connected to terminal pins F and E of a power cable connector, and said first resistor connected to terminal pin D of said power cable connector, producing a low voltage dc signal across terminal pins F, E to D;

(b) a current sense means connected to output terminals of said driver pair and to logic ground, said current sense means producing a current sense voltage signal output whose amplitude is related to current flowing from said driver pair;

(c) a first push-button switch having a pole connected to a reference voltage source, said first push-button switch being designated as a START switch;

(d) a second push-button switch having a pole connected to a reference voltage source, said second push-button switch being designated as a STOP switch; and (e) means for detecting a confirming signal of proper power connection to an aircraft and generating an output power ON signal in response, said means for detecting being connected to the output of said current sense means, to a pole of said START switch and to a pole of said STOP switch;

said means for detecting a confirming signal providing an output power ON high signal for commanding turn-on of an installation or mobile power source when said START switch is depressed and a confirmation signal of proper power connection is detected.

2. An electric power-on control circuit according to claim 1
wherein said means for detecting a confirming signal of proper power connection to an aircraft includes a detector circuit, said detector circuit comprising:
 a flip-flop which is connected to output signals from said START switch and said STOP switch, a voltage divider which is supplied by a reference voltage source,
 a comparator which is connected to output signals from said voltage divider and said current sense means, and
 an AND gate which receives and is connected to output signals from said flip-flop and said comparator;

said detector circuit receiving a confirmation signal of at least 0.078 volts from said current sense and connecting said confirmation signal to an input terminal of said comparator, said comparator having at the same time, a reference voltage signal of about 0.05 volts from said voltage divider connected input to said comparator, said comparator producing a high signal connected to an input terminal of said AND gate;

said START switch, when depressed momentarily, transmitting a voltage signal to the S terminal of said flip-flop, causing the Q terminal of said flip-flop to output a high signal, said output high signal being connected to a second input terminal of said AND gate, said AND gate producing a high signal at its output terminal, serving as an ON command signal for connection to an airport or mobile electric power source, turning power on to a cable which is connected to an aircraft.

3. The electric power-on control circuit according to claim 1, wherein said isolation transformer is a small toroid of magnetic material, having less than eight primary and secondary winding turns, said isolation transformer providing at least 4000 volts isolation and high common mode signal rejection.

* * * * *